US007941848B2

(12) United States Patent
Yadav et al.

(10) Patent No.: US 7,941,848 B2
(45) Date of Patent: May 10, 2011

(54) ELEVATING RIGHTS

(75) Inventors: Anil K Yadav, Issaquah, WA (US);
Jerry K Koh, Redmond, WA (US);
Steve Scallen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 11/275,817

(22) Filed: Jan. 30, 2006

(65) Prior Publication Data
US 2007/0180501 A1 Aug. 2, 2007

(51) Int. Cl.
G06F 7/04 (2006.01)
G06F 12/14 (2006.01)
G06F 21/22 (2006.01)

(52) U.S. Cl. ............... 726/21; 726/16; 726/17; 726/26; 726/28; 713/182; 713/183

(58) Field of Classification Search .................. 726/17, 726/21, 26, 28; 705/8, 9
See application file for complete search history.

(56) References Cited

U.S. PATENT DOCUMENTS

| | | | |
|---|---|---|---|
| 5,369,764 A | 11/1994 | Blair | |
| 5,655,077 A | 8/1997 | Jones et al. | |
| 5,774,551 A | 6/1998 | Wu et al. | |
| 5,864,665 A | 1/1999 | Tran | |
| 6,017,177 A | 1/2000 | Lanham | |
| 6,209,100 B1 | 3/2001 | Robertson et al. | |
| 6,308,173 B1 | 10/2001 | Glasser et al. | |
| 6,473,794 B1 | 10/2002 | Guheen et al. | |
| 6,609,198 B1 | 8/2003 | Wood et al. | |
| 6,643,690 B2 | 11/2003 | Duursma et al. | |
| 6,651,166 B1 | 11/2003 | Smith et al. | |
| 6,651,168 B1 | 11/2003 | Kao et al. | |
| 6,795,855 B2 | 9/2004 | Bonilla et al. | |
| 6,799,178 B2 | 9/2004 | Iwase et al. | |
| 6,807,636 B2 | 10/2004 | Hartman et al. | |
| 6,982,962 B1 | 1/2006 | Lunsford et al. | |
| 7,065,360 B2 | 6/2006 | Yahagi | |
| 7,152,164 B1 | 12/2006 | Loukas | |
| 7,178,025 B2 | 2/2007 | Scheidt et al. | |
| 7,305,709 B1 | 12/2007 | Lymer et al. | |

(Continued)

FOREIGN PATENT DOCUMENTS

JP 2000122975 A 4/2000

(Continued)

OTHER PUBLICATIONS

Ha, John. "Red Hat Linux Getting Started Guide." Red Hat Docs. Apr. 8, 2003. Red Hat, Incorporated. http://web.archive.org/web/20030418075045/http://www.redhat.com/docs/manuals/linux/RHL-9-Manual/getting-started-guide/.pp. 35, 105, 146.*

(Continued)

*Primary Examiner* — Kambiz Zand
*Assistant Examiner* — Imhotep Durham
(74) *Attorney, Agent, or Firm* — Lee & Hayes, PLLC (57) ABSTRACT

System(s), techniques, and/or method(s) ("tools") are described that enable a user to elevate his or her rights. The tools may do so by switching a user to an account having higher rights or a different, higher-rights context of a same account. The tools may elevate a user's rights after a user enters a secure access sequence, such as Control+Alt+Delete, clicks on a button, or enters credentials. The tools may also enable a user to identify tasks that need higher rights to be performed by visually correlating graphic indicia with these tasks.

19 Claims, 12 Drawing Sheets

U.S. PATENT DOCUMENTS

| | | | |
|---|---|---|---|
| 7,617,530 | B2 | 11/2009 | Ruzyski et al. |
| 2002/0031230 | A1 | 3/2002 | Sweet et al. |
| 2002/0038333 | A1 | 3/2002 | Evans et al. |
| 2002/0112155 | A1 | 8/2002 | Martherus et al. |
| 2002/0186260 | A1 | 12/2002 | Young |
| 2003/0046392 | A1 | 3/2003 | Wen et al. |
| 2003/0065626 | A1 | 4/2003 | Allen |
| 2003/0097574 | A1 | 5/2003 | Upton |
| 2003/0177388 | A1 | 9/2003 | Botz et al. |
| 2003/0182586 | A1 | 9/2003 | Numano |
| 2003/0212904 | A1 | 11/2003 | Randle et al. |
| 2004/0034704 | A1 | 2/2004 | Connelly |
| 2004/0039909 | A1 | 2/2004 | Cheng |
| 2004/0088405 | A1 | 5/2004 | Aggarwal |
| 2004/0117358 | A1 | 6/2004 | von Kaenel et al. |
| 2004/0139355 | A1 | 7/2004 | Axel et al. |
| 2004/0210771 | A1 | 10/2004 | Wood et al. |
| 2004/0243824 | A1 | 12/2004 | Jones |
| 2005/0091213 | A1 | 4/2005 | Schutz et al. |
| 2005/0108770 | A1 | 5/2005 | Karaoguz et al. |
| 2005/0132070 | A1 | 6/2005 | Redlich et al. |
| 2005/0188210 | A1* | 8/2005 | Perlin et al. .................. 713/183 |
| 2005/0188313 | A1 | 8/2005 | Matthews et al. |
| 2005/0188314 | A1 | 8/2005 | Matthews et al. |
| 2005/0188317 | A1 | 8/2005 | Matthews et al. |
| 2005/0235148 | A1 | 10/2005 | Scheidt et al. |
| 2005/0268107 | A1 | 12/2005 | Harris et al. |
| 2006/0075475 | A1 | 4/2006 | Boulos et al. |
| 2006/0085752 | A1 | 4/2006 | Beadle et al. |
| 2006/0165060 | A1 | 7/2006 | Dua |
| 2006/0174308 | A1 | 8/2006 | Fuller et al. |
| 2006/0174323 | A1 | 8/2006 | Brown et al. |
| 2006/0242427 | A1 | 10/2006 | Ruzyski et al. |
| 2007/0033191 | A1 | 2/2007 | Hornkvist et al. |
| 2007/0106892 | A1 | 5/2007 | Engberg |
| 2007/0180502 | A1 | 8/2007 | Yadav et al. |
| 2007/0186106 | A1 | 8/2007 | Ting et al. |
| 2007/0198933 | A1 | 8/2007 | van der Bogert et al. |

FOREIGN PATENT DOCUMENTS

| | | | |
|---|---|---|---|
| JP | 2003223235 | A | 8/2003 |
| JP | 2004295632 | A | 10/2004 |
| RU | 2158444 | C2 | 10/2000 |
| RU | 2003102377 | A | 6/2004 |
| RU | 2237275 | C2 | 9/2004 |
| WO | WO0111451 | A1 | 2/2001 |
| WO | WO0201462 | A2 | 1/2002 |

OTHER PUBLICATIONS

Ha, John. "Red Hat Linux Security Guide." Red Hat Docs. Apr. 8, 2003. Red Hat, Incorporated. http://web.archive.org/web/20030418075045/http://www.redhat.com/docs/manuals/linux/RHL-9-Manual/getting-started-guide.pp. 26-28.*

Miller, Todd. "Sudoers Manual." Jul. 11, 2004. http://web.archive.org/web/20040711020555/www.gratisoft.us/sudo/man/sudoers.html.*

Miller, Todd. "Sudo Manual." Jul. 11, 2004. http://web.archive.org/web/20040711020526/http://www.gratisoft.us/sudo/man/sudo.html.*

Sweet, David, and et al. "KDE 2.0 Development: 5.3 Standard Dialog Boxes". 2000. http://developer.kde.org/documentation/books/kde-2.0-development/index.html.*

Ubuntu Documentation Team. "Ubuntu FAQ Guide: Chapter 6—Users Administration" Linuxtopia. May 31, 2005. http://web.archive.org/web/20060613201922/www.linuxtopia...tem_administration_books/ubuntu_starter_guide/index.html.*

Debian Administration. Giving ordinary users root privileges, selectively. Steve Kemp. Oct. 16, 2004. http://www.debian-administration.org/articles/33/print.*

Direct User Switching Task for Windows XP. Aug. 24, 2003.http://web.archive.org/web/20030824072430/www.waybeyonduk.com/DUST/.*

Debian Admin. Enable and Disable Ubuntu Root Password. Sep. 28, 2006. http://www.debianadmin.com/enable-and-disable-ubuntu-root-password.html.*

GKSU: A Gtk+ su front end Linux Man Page. http://www.penguin-soft.com/penguin/man/1/gksu.html.*

Microsoft Help and Support. How to make files and folders private in Windows XP so that only you have access to them. http://support.microsoft.com/kb/930987/en-us.*

Learning the shell.Permissions. http://www.linuxcommand.org/Its0070.php.*

Quick HOWTO. Ch09 : Linux Users and Sudo. Dec. 23, 2005. http://web.archive.org/web/20060203023004/http://www.linuxhomenetworking.com/wiki/index.php/Quick_HOWTO_:_Ch09_:_Linux_Users_and_Sudo.*

Man Pages. Ls. http://www.linuxcommand.org/man_pages/ls1.html.*

Ubuntu Documentation. RootSudo. Dec. 31, 2005. https://help.ubuntu.com/community/RootSudo.*

The Elder Geek on Windows XP. Switch User in Windows XP. http://web.archive.org/web/20041215071735/theeldergeek.com/HT0_005.htm.*

The Ubuntu Quick Guide. Chapter 3. Applications Menu: System Tools. http://people.ubuntu.com/~mako/docteam/quickguide/ch03s07.html.*

The KDE su Command. Nov. 20, 2004. http://www.linfo.org/kdesu.html.*

Linux Tutorials. Using Sudo. Tony Lawrence. May 12, 2005. http://web.archive.org/web/20050530041932/www.developertutorials.com/tutorials/linux/using-sudo-050511/page1.html.*

Using Windows XP > Computer Setup and Maintenance. How to switch between users. Sep. 7, 2006. http://www.microsoft.com/windowsxp/using/setup/winxp/switchusers.mspx.*

"How to Use the Fast User Switching Feature in." Microsoft Help and Support. Jul. 15, 2004. Microsoft. <http://web.archive.org/web/20041212131045/http://support.microsoft.com/kb/279765>.*

Barkley, John. "Principle of Least Privilege." National Institute of Standards and Technology. National Institute of Standards and Technology. Jan. 9, 1995 <http://hissa.nist.gov/rbac/paper/node5.html>.*

Accelerator, Hot keys, and Shift Key. In Microsoft Computer Dictionary. Microsoft Press 2002. (Microsoft Dictionary).*

Habraken, Joe. Novell® Linux Desktop 9 User's Handbook. Novell Press, 2005. 32-34, 151-153. Print.*

Ha, John. "Red Hat Linux 9: Red Hat Linux Customization Guide." Red Hat Docs. Apr. 8, 2003. Red Hat, Incorporated. http://web.archive.org/web/20030408104445/http://www.redhat.com/docs/manuals/linux/RHL-9-Manual/custom-guide/ch-redhat-config-users.htm.Chapter 25. User and Group Configuration. (RedHat Customization).*

Lai, et al., "User Authentication and Authorization in the Java Platform", INSPEC, 1999, pp. 285-290.

Andress et al., "Test Center-New Products Test In Real-World Enviroments", Trinity 3.3, Information Security Magazine, Jan. 2002. Retrieved from the Internet.

Rathbone, "Windows XP for Dummies", Wiley Publishing Inc, 2001, pp. 62-64, 66, 106-107, 128 and 314.

Gamma, E. et al., "Design Patterns", 1995, Addison-Wesley, Reading, MA, USA, pp. 139-143, 148-150.

Pittaway, et al., "Distributed security services in Microsoft Windows NT 5.0—Kerberos and the active directory", Information Security Technical Report, Elsevier Advanced Technology, vol. 4, 1999, pp. 20-21.

Wiseman, et al., "Adding Security Labelling to Windows NT", Information Security Technical Report, Elsevier Advanced Technoloy, vol. 4, 1999, p. 20-21.

European Search Report for European Patent Application No. 04019100.9 Mailed on Feb. 8, 2008, pp. 6.

Abrams, "Using Spybot—Search and Destroy to remove Spyware from Your Computer", Mar. 25, 2004, pp. 1-pp. 13.

* cited by examiner

ELEVATING RIGHTS

BACKGROUND

Generally, two types of accounts are used to log a user on to a computer's operating system. One has nearly unlimited rights, often called an administrator account, the other has limited rights, often called a standard user account.

Standard user accounts permit some tasks but prohibit others. They permit most applications to run on the computer but often prohibit installation of an application, alteration of the computer's system settings, and execution of certain applications. Administrator accounts, on the other hand, generally permit most if not all tasks.

Not surprisingly, many users log on to their computers with administrator accounts so that they may do nearly whatever they want. But there are significant risks involved in using administrator accounts. Malicious code may perform whatever tasks are permitted by the account currently in use, such as installing and deleting applications and files—potentially highly damaging tasks. This is because most malicious code performs its tasks while impersonating the current user of the computer—thus, if a user is logged on with an administrator account, the malicious code may perform dangerous tasks permitted by that account.

To reduce these risks, a user may instead log on with a standard user account. Logging on with a standard user account may reduce these risks because the standard user account may not have the right to permit malicious code to perform many dangerous tasks. If the standard user account does not have the right to perform a task, the operating system may prohibit the malicious code from performing that task. For this reason, using a standard user account may be safer than using an administrator account.

But the user may be prohibited from performing legitimate tasks—like installing a file known to be safe. To install this file, the user may need to switch to an account that has a right to permit the task. To do so with relative safety, the user may need to log off from the standard user account, log on to an administrator account, install the file, log off from the administrator account, and then log back on with the standard user account. This is disruptive.

SUMMARY

System(s), techniques, and/or method(s) ("tools") are described that enable a user to elevate his or her rights. The tools may do so by switching a user to an account having higher rights or a different, higher-rights context of a same account. In some cases the tools elevate the user's rights context within a same user session; this permits a user to perform a disabled or prohibited task without requiring that the user logoff and back on. The tools may elevate a user's rights after a user enters a secure access sequence, such as Control+Alt+Delete, clicks on a button, or enters credentials. The tools may also enable a user to identify tasks that need higher rights to be performed by visually correlating graphic indicia with these tasks.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following disclosure describes tools enabling a user to elevate his or her rights, such as by switching the user to an account having higher rights or a different, higher-rights context of a same account. The tools may permit a user to elevate his or her rights with a simple assent, like clicking on a button or typing a keystroke, or with entry of credentials. When the tools elevate a user's rights within a same user session, the user may perform tasks previously not permitted without requiring that the user logoff or back on.

The tools may interact with a user through various user interfaces. One of these user interfaces enables a user to select to elevate his or her rights by selecting graphic or textual indicia. Another of these user interfaces enable a user to select to elevate rights by selecting an account and entering a password or other credentials. Still another of these user interfaces indicate which tasks need higher rights, thereby helping a user to understand which tasks are not available for lack of rights and which are not available for some other reason.

For example, if a user is logged on to a computer's operating system with a limited-rights account and is unable to install a file, the tools may help him know that the reason he cannot install the file is because his rights are insufficient. The tools may also enable him to select to elevate his rights, and thereby install the file, with a simple click of a mouse.

An environment in which these tools may operate is set forth in a section entitled Exemplary Operating Environment. This is followed by other sections, one entitled Elevating Rights, which describes exemplary ways in which the tools enable a user to elevate his or her rights, and another entitled Additional Exemplary User Interfaces for "Unlocking" a Task, which describes exemplary user interfaces enabling a user to elevate rights using a lock/unlock metaphor.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to a particular operating environment.

Figure 1:
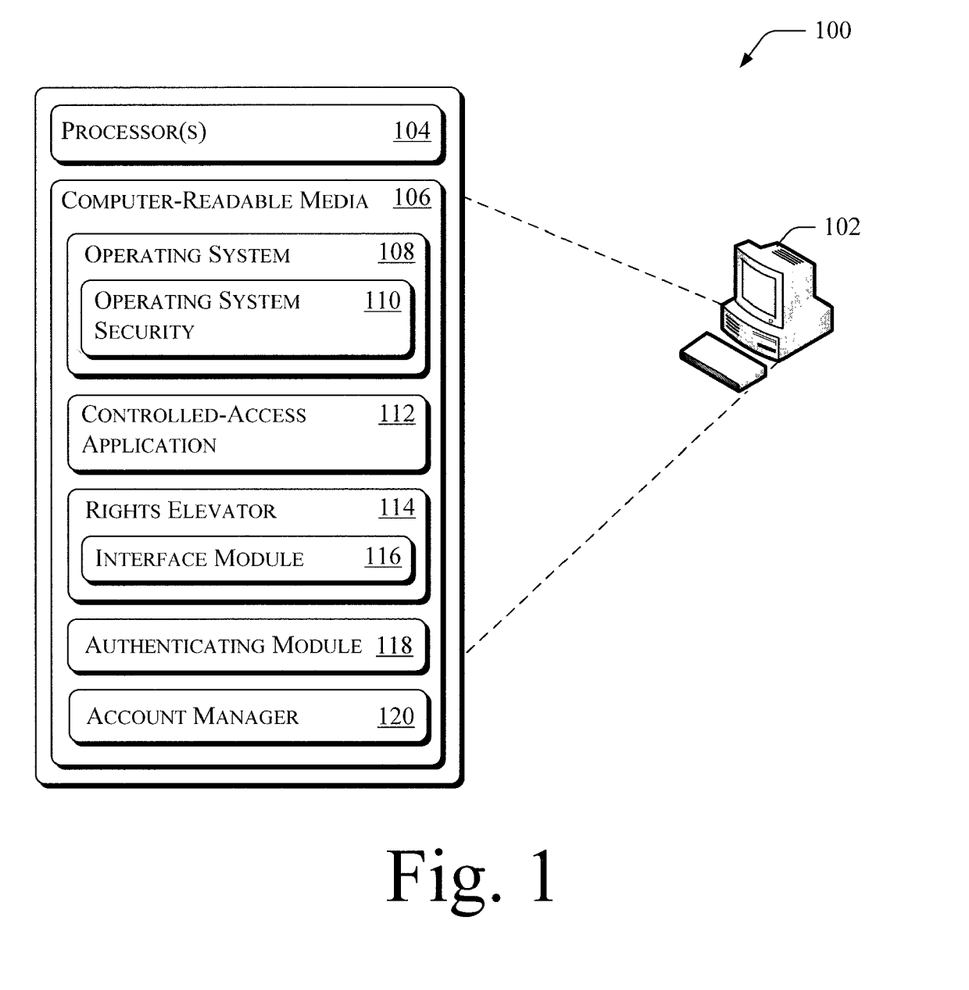
FIG. 1 illustrates an exemplary operating environment in which various embodiments can operate.

FIG. 1 illustrates one such operating environment generally at 100 it comprising a computer 102 having one or more processor(s) 104 and computer-readable media 106. The processor(s) are capable of accessing and/or executing the computer-readable media. The computer-readable media comprises an operating system 108 having an operating system security 110, a controlled-access application 112, a rights elevator 114 having an interface module 116, an authenticating module 118, and an account manager 120.

Operating system 108 is capable of managing applications and tasks on computer 102. The operating system comprises operating system security 110, which is capable of determining whether a task is permitted by a user's current rights. Computer 102 may also comprise controlled-access application 112. This application is capable of prohibiting tasks that may otherwise be permitted by a user's current rights. One example of the controlled-access application is parental-control software designed to prohibit specific tasks when a child is using the computer, such as a task to display a certain website, run a certain application, or perform any task during a certain time of day.

Rights elevator 114 is capable of elevating a user's rights effective to enable performance of a task. The rights elevator may enable a user to elevate his rights from that of a limited-rights account, such as a standard user (e.g., non-administrative) account, to a higher-rights account, such as an administrator account. The rights elevator may also enable a user to elevate his rights by switching from a limited-rights context of an account to a higher-rights context of that account. The rights elevator may do so within a same user session. This can be effective to raise the user's rights, enable performance of the task, and lower the user's rights without requiring that the user logoff and/or back on to the operating system. The rights elevator may enable the user to select to elevate his or her rights through interface module 116, which is shown integral with, but may also be separate from, the rights elevator.

Authenticating module 118 is capable of authenticating credentials for a particular account, such as by determining that a selected higher-rights account is submitted with an authentic password. Account manager 120 comprises information sufficient to determine what user accounts are available and the rights of those accounts, including whether an account has multiple rights contexts and the rights of each of those contexts.

Various embodiments of these elements, and particularly how these elements act and interact to perform exemplary processes and produce exemplary user interfaces, are set forth in greater detail below.

Elevating Rights

When a user is logged onto a computer with an account having limited rights, some tasks may not be enabled based on the user's current rights. If a user's current rights do not permit a task, such as one requested by a software application or another by the user himself, the operating system may not enable that task. In some cases this is advantageous, such as when a task is requested by malicious code. Also, whether the user's current rights permit the task or not, other software, such as controlled-access application 112, may act to prohibit that task from being performed. The following discussion describes exemplary ways in which elements of operating environment 100 enable an individual to elevate his or her rights effective to enable a disabled, delayed, or previously prohibited task.

Figure 2:
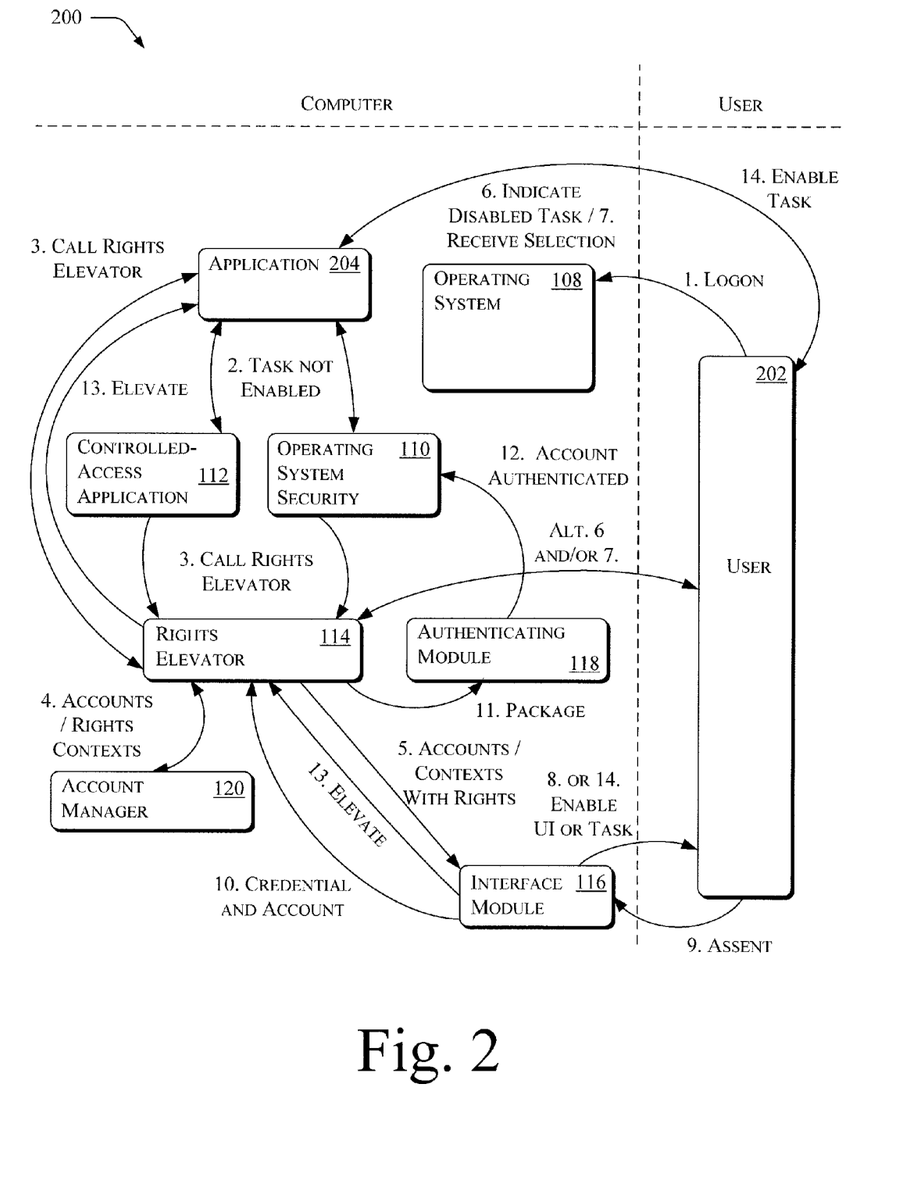
FIG. 2 is a flow diagram of an exemplary process for enabling a user to elevate rights.

Referring to FIG. 2, an exemplary flow diagram 200 for elevating rights is shown. Flow diagram 200 illustrates a set of actions by, and accompanying communications between, elements of environment 100, a user 202, and an application 204. The elements shown are operating system 108, operating system security 110, controlled-access application 112, rights elevator 114, interface module 116, authenticating module 118, and account manager 120. The actions and accompanying communications are marked with arrows. The flow diagram is oriented showing computer actions and user actions, communication between the computer and the user represented by lines passing through a dashed line separating the two. This flow diagram may be implemented in any suitable hardware, software, firmware, or combination thereof. In the case of software and firmware, this diagram represents sets of operations implemented as computer-executable instructions.

At arrow 1, user 202 logs into operating system 108 with an account having limited rights. The account may have just one set of rights (e.g., limited rights) or multiple rights contexts. If the account has multiple rights contexts (a "multi-rights account"), assume that the user is operating with a limited-rights context insufficient to permit a task described below but that the multi-rights account has a least one higher-rights context that is sufficient to permit the task. An account may also have generally high rights, such as an administrative account, but be limited by a controlled-access application, and thus have insufficient rights to perform a task.

In either case, the account's limited right to perform tasks may be enforced by operating system security 110 and/or controlled-access application 112.

At arrow 2, after the user logs onto the computer, a task is not enabled based on the user's current rights. Application 204 may learn that the task in not enabled through communication with the controlled-access application or the operating system security, shown in FIG. 2 with arrows. The task may have been attempted, such as by a user or malicious code attempting to install an application downloaded over the Internet. In this case application 204 may be a download module, network browser, or file manager that prohibits the attempted installation. When a task is attempted, the controlled-access application or the operating system security may intercept the task prior to it being performed, check the task against the rights of user 202, determine that the task is not permitted, and prohibit the task from being performed.

The task may also be one that application 204 cannot enable based on the user's current rights, rather than one that has been attempted and prohibited. In this case the application may, for instance, be a settings module for operating system 108 that is attempting to enable a user to alter the operating system's date and time.

At arrow 3, the rights elevator is called. The application or the element prohibiting the task may request that the rights elevator enable a user to elevate, or begin a process for elevating, his rights. The request may be from controlled-access application 112 or operating system security 110, such as when an application attempts to perform a task that is prohibited by either of these elements. The call may also be directly from the application, such as when the application has tasks not yet enabled because of the user's rights. Protocols (e.g., APIs) followed to call the rights elevator and its user interface may be public, thereby enabling various applications to call the rights elevator, whether or not task was first attempted and prohibited or not yet enabled.

This call indicates that a task has been prohibited and/or that a right is needed. Application 204, operating system security 110, or controlled-access application 112 may inform the rights elevator about the type of task, the type of rights needed in order to permit the task, and/or the type of account needed to permit the task (e.g., an unlimited rights account).

At arrow 4, rights elevator 114 determines which accounts or rights-contexts have rights sufficient to permit the task, if any. The rights elevator may also determine which accounts or rights contexts have the least rights sufficient to permit the task. This enables use of an account or rights context that permits the task but may be safer to use that an account or rights context having higher rights than are needed.

The rights elevator may do so by communicating with account manager 120, such as by passing a flag for accounts or rights contexts having unlimited rights (or sufficient rights) according to an application program interface (API). The rights elevator may find, receive, or determine indicators or other identifying information sufficient to enumerate one or more of these accounts or rights contexts. The account manager may return all accounts or rights contexts having sufficient rights to permit the prohibited task, such as all administrator or other nearly unlimited-rights accounts or a rights context of the user's current account, or only the account or rights context having minimally sufficient rights to permit the task.

At arrow 5, rights elevator communicates accounts and/or rights contexts having sufficient rights to interface module 116. These accounts are those capable of permitting a task that is not permitted by the user's current rights. The rights elevator may communicate these accounts by passing a flag to the user interface with information sufficient to identify the accounts, such as with names, icons, and the like. With rights contexts, the account may not need to be identified.

In some cases it is useful to show a user that a particular task is prohibited or not enabled. When a particular task has been attempted and prohibited, this may be indicated with a user interface explaining that the attempted task is prohibited. When a task or tasks have not been attempted and prohibited, or when a task is part of a larger set of tasks, the tasks that are disabled for lack of rights may be visually indicated. This may help a user differentiate between tasks that are disabled for lack of user rights, tasks that are disabled for some other reason, and tasks that are enabled.

At arrow 6, the tools indicate that a task is disabled for lack of user rights. Application 204 may do so in its own user interface following communication from the rights elevator that the user's rights are insufficient. The application may also do so based on an assumption that the user's rights are insufficient, and thus as early as immediately following arrow 1. The application may also indicate this through interface module 116, described later below.

Figure 3:
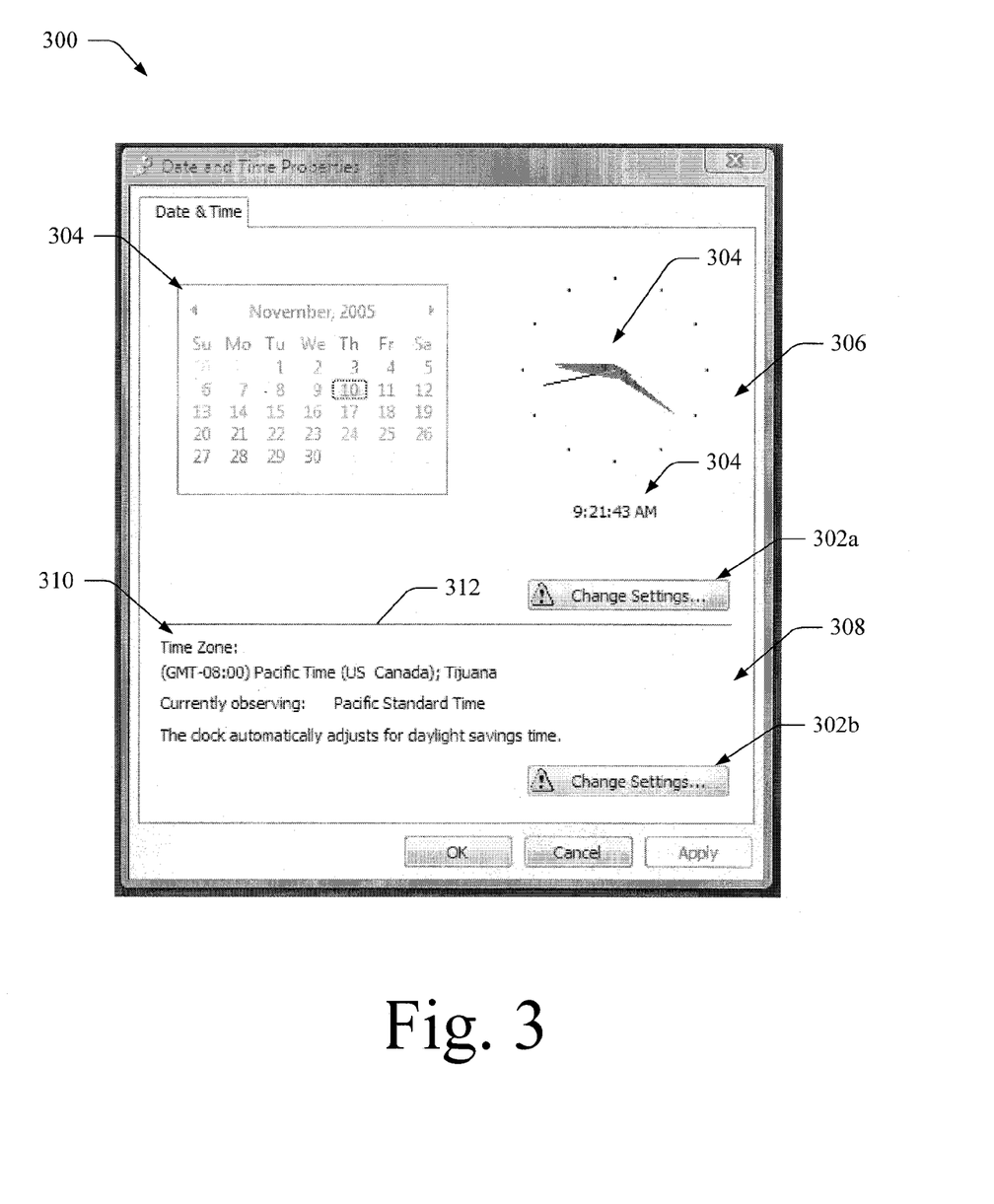
FIG. 3 illustrates an exemplary user interface having elevation indicia corresponding to tasks that require higher rights.

FIG. 3 sets forth an exemplary user interface 300 comprising elevation indicia 302a corresponding to tasks 304 that require higher rights. These elevation indicia may indicate the exact need—that of higher rights—rather than indicia that may indicate only that the tasks are disabled. Here the need for higher rights is indicated with a triangular graphic having an exclamation point. By indicating this need, a user may understand that these tasks need the user to elevate his rights rather than some other action, like a different application setting or a software upgrade.

This user interface also corresponds the elevation indicia to those tasks that require higher rights and not those that are enabled or are disabled for some other reason. Here the user interface has two regions, a first region 306 correlating the indicia to tasks 304 that require higher rights and a second region 308 with tasks 310 not correlated to indicia 302a. Regional separator 312 separates these regions and indicates that indicia 302a correlates to tasks 304 and not to tasks 310.

Note also that tasks 310 may also be selected separately with second elevation indicia 302b, which in this case indicates that tasks 310 require higher rights, though these rights may be lower, the same, or higher than those required for tasks 304.

The tools also enable elevation indicia 302 to be selected by a user effective to initiate a process for elevating the user's rights. Here selection of indicia 302a may initiate a process for elevating the user's rights only for tasks 304, rather than all tasks (tasks 310 or otherwise). This may limit the use of the higher-rights context or account to those tasks correlating to the indicia that is selected.

Arrow 7 receives a selection to elevate a user's rights. This selection may be through a graphical user interface, keystroke(s), or otherwise. In the user interface of FIG. 3, this selection is received through the user clicking on indicia 302a or 302b. Arrows 6 and 7 are shown connecting the application and the user or, alternatively, the rights elevator and the user.

Figure 4:
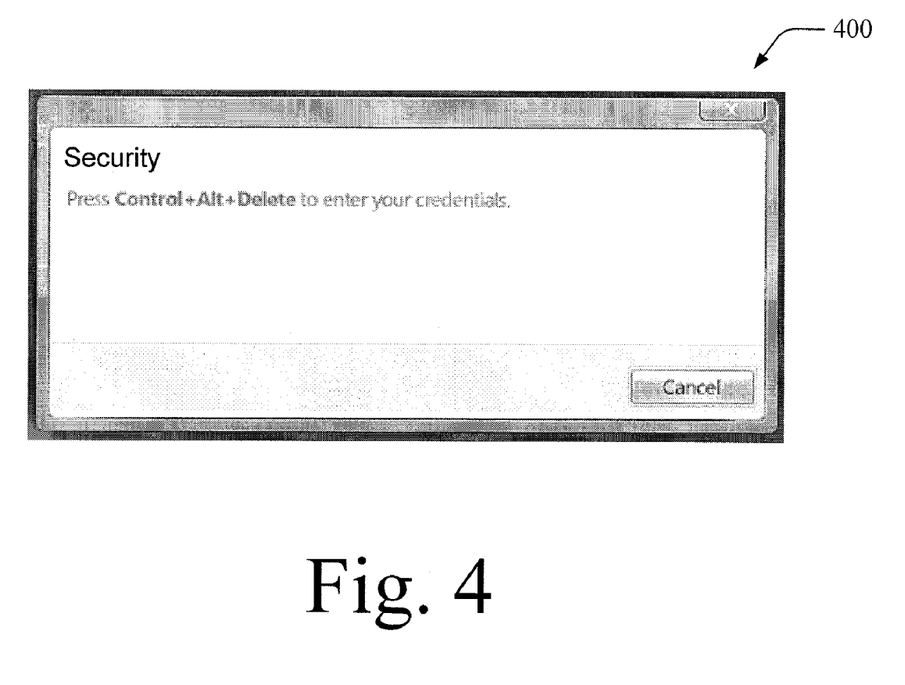
FIG. 4 illustrates an exemplary user interface indicating that a user must enter a secure access sequence to elevate his or her rights.

In some other cases, however, the tools enable a user's selection through other or additional manners, such as by indicating that a secure access sequence is needed. In FIG. 4, for example, the tools present an exemplary user interface 400 indicating that the user must enter "Control+Alt+Delete" at one time (an example of a secure access sequence) to initiate a process for elevating his or her rights (here by entry of credentials). The tools, in some other cases, may elevate a user's rights based on this entry, rather than requiring additional entries, assent, and/or credentials. The tools may also present an indication that a secure access sequence is needed in response to selection of elevation indicia or a task being attempted and prohibited.

At arrow 8, interface module 116 creates a user interface capable of enabling the user to assent to elevating his or her rights. This assent may be with or without credentials and with or without selecting a particular account or rights context.

This user interface may be graphical and comprise one, many, or all accounts having sufficient rights. In some cases all of the accounts may be so many as to be cumbersome. In these cases, the interface module and/or rights elevator may select which to present based on various criteria, such as frequency of use, those associated with the current user, those with sufficient but not unlimited rights, and the like. If there are accounts or rights contexts with lower rights than others, the interface module may also indicate this. If, for instance, a user is logged on with a multi-rights account, the interface module may present a higher-rights context that minimally permits the task and not an even higher, higher-rights context.

The accounts so presented may be identified to the user, thereby permitting the user to know which account is which. One potential benefit of this is that the user, by knowing which account is which, may select one without having to find or type in the name of the account. The accounts may be identified with graphics (e.g., graphic tiles or icons), text (e.g., a name of each account), and the like.

Figure 5:
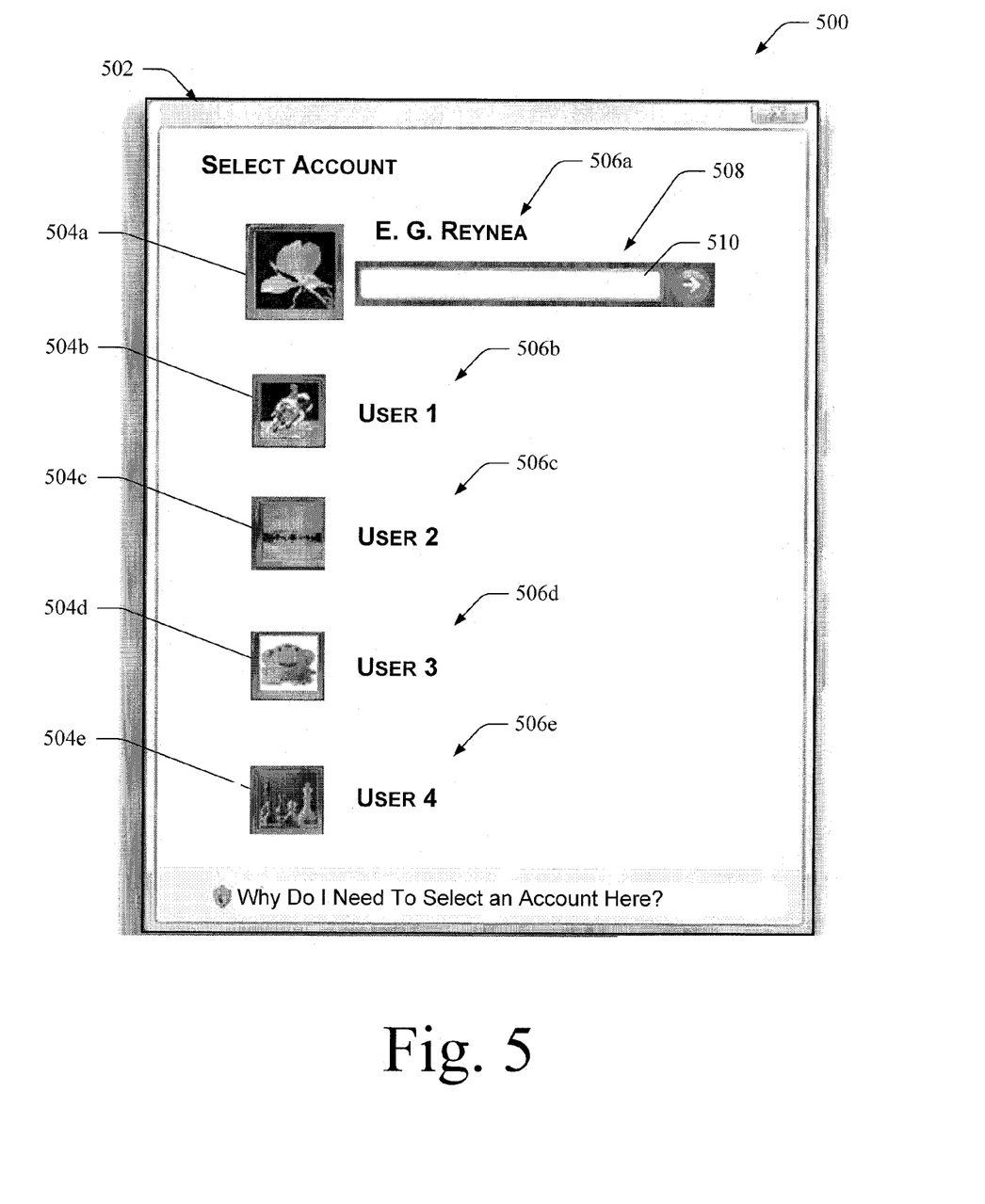
FIG. 5 illustrates an exemplary graphical user interface having multiple accounts.

Referring to FIG. 5, an exemplary graphical user interface 500 is shown. Five accounts having sufficient rights are shown, each with a graphic region 504 (labeled 504a, 504b, 504c, 504d, and 504e) and a name region 506 (labeled 506a, 506b, 506c, 506d, and 506e). Each of the graphics may indicate the account or a user associated with that account. Thus, if an account's graphic represents the information technology department's on-call technician, for instance, the user may know to contact that technician for a password or other help. If, on the other hand, different graphics represent different parents or guardians of a child using a computer, the child may know which parent to ask for a password to perform the prohibited task and which password field to type in that password (if multiple fields are shown). The name regions comprise names identifying the accounts, here "E. G. Reynea", "User1", "User2", "User3", and "User4".

The graphical user interface also permits entry of a user's assent (or attempt to assent) to elevate his rights. In one embodiment, each of the accounts has an associated credential region into which the user may entry assent with credentials. This permits a user to enter a password or other credential for an account and, by so doing, also select that particular account.

As shown in FIG. 5, the graphical user interface comprises a single credential region 508 having a data-entry field 510 for entry of a password. In this case a user may select an account, such as by clicking on a graphic in graphic region 504a or text in name region 506a for the "E. G. Reynea" account. The user may then type a password into data-entry field 510 of credential region 508. This data-entry field may exist prior to a user's selection of an account; in this case a user's selection indicates to which account the user wants to associate a password input to the field. In this embodiment, however, interface module 116 presents credential field 508 near an account once that account is selected.

Figure 6:
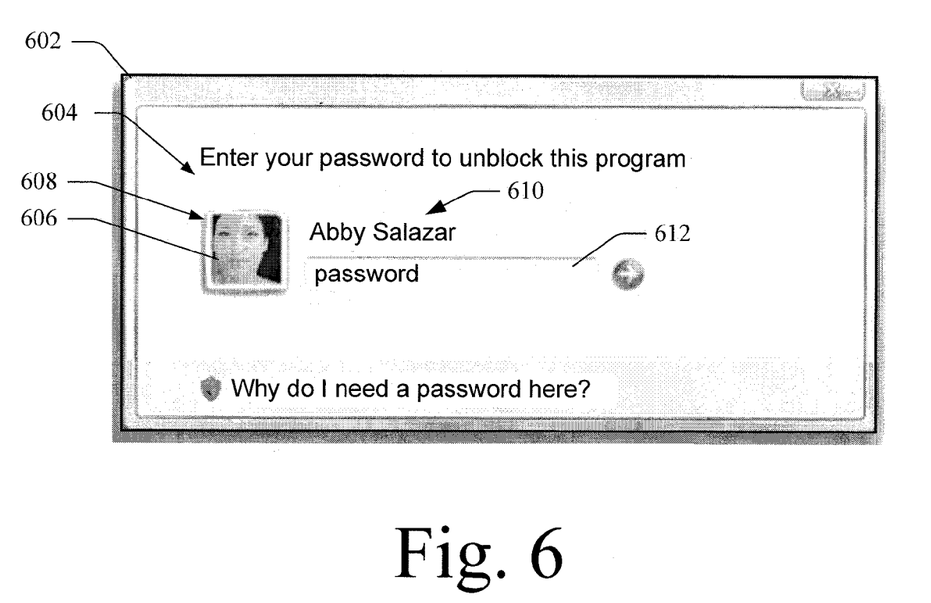
FIG. 6 illustrates an exemplary user interface enabling assent with credentials.

Referring to FIG. 6, an exemplary single-account graphical user interface 602 is shown. Here an account 604 having sufficient rights to permit the prohibited task is shown with two indicia. The first indicia, that of the current user's picture 606 at graphic region 608, identifies the person associated with the account. The second indicia, that of the account's name, entitled "Abby Salazar" and shown at name region 610, identifies the person associated with the account and the account itself.

This account may have the same name and indicia as that of the user's current, limited-rights account. It also may be authenticated with the same credential (e.g., password) as used for the user's current limited-rights account. Thus, if a user's current, limited-rights account name is "Abby Salazar" (shown at 610) and password is "Abby" (not shown), the user may elevate her rights to permit the prohibited task simply by entering "Abby" into credential field 612. Also, the user does not need, in this case, to remember an account that she has not recently used because the account and password are the same as the ones she entered at arrow 1 to logon to the operating system.

The user interfaces of FIGS. 5 and 6 describe a manner by which a user may assent to elevate his rights with credentials. The tools may also receive a user's assent without credentials, such as when the user's current account has multiple rights contexts.

Figure 7:
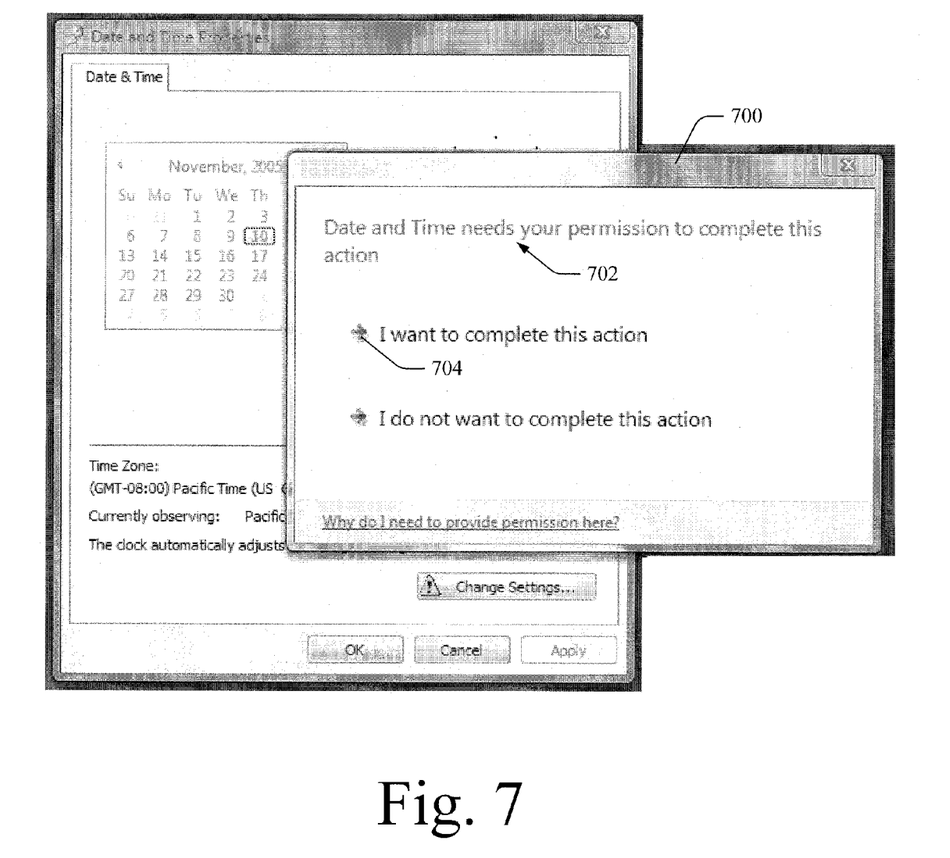
FIG. 7 illustrates an exemplary user interface enabling assent without credentials.

FIG. 7 sets forth an exemplary user interface 700 enabling assent without credentials. This user interface comprises information indicia 702 indicating that a task requires the user's permission to permit the task. It also comprises selectable graphic indicia 704 enabling a user to select to permit the task. As shown, the user is enabled to assent to elevate his rights context without credentials and with a single mouse click on indicia 704. This helps reduce the interruption users endure when elevating their rights. Note that this user interface may be provided responsive to a user selecting indicia 302a or 302b of FIG. 3.

Elevating the user's rights may include switching accounts or switching rights contexts. In FIG. 5, the user selected a different account having higher rights than the user's current account.

In FIGS. 6 and 7, a user selected a higher rights-context of a multi-rights account. This multi-rights account may, in some cases, have multiple tags, one for each rights context. By default the multi-rights account may be tagged with a limited-rights-context tag when logging in. This tag may be altered by the rights elevator on entry of a credential or assent, such as a password into field 612 of FIG. 6 or assent by selecting indicia 704 in FIG. 7.

At arrow 9, the tools receive a user's assent to elevate his or her rights. Responsive to receiving a credential, the tools may proceed to arrows 10, 11, and 12. If assent is received without a credential, the tools may proceed directly to arrow 13.

At arrow 10, the interface module sends the account and credential to be authenticated. Following FIG. 5, the interface module sends an indication of the account selected and a credential for that account to the rights elevator. Following FIG. 6, the user may enter password "Abby", after which the interface module sends "Abby" and "Abby Salazar" to the rights elevator.

At arrow 11, rights elevator 114 packages the credential and associated account and communicates these to authenticating module 118. This package may be a computer-readable package with the credential and the account associated with the credential, all in a format readable and analyzable by the authenticating module. The authenticating module may be part of and integral with operating system security 110 or controlled-access application 112, in which case communicating the package is trivial.

At arrow 12, the account is authenticated (or not authenticated). If it is not authenticated, rights elevator 114 and interface module 116 may attempt to elevate the user's rights by repeating some of the prior arrows until the account is authenticated at arrow 12. The authentication of the account may be communicated to the entity prohibiting the task, such as operating system security 110, shown in FIG. 2.

At arrow 13, the rights elevator elevates the user's rights effective to enable a disabled or prohibited task. The rights elevator may temporarily elevate the user's rights just for the now-permitted task. From FIG. 3, for instance, the tools may elevate the user's rights for just those tasks corresponding to the elevation indicia selected by the user.

At arrow 14, the tools enable the previously disabled or prohibited task. The application 204 may enable the task through the rights elevator or its interface module or do so on its own.

If, for instance, the user assented to elevate his or her rights in order to change the operating system's date and time (see FIGS. 3 and 7), the operating system's date and time module may present a user interface enabling the user to change its date and time.

Figure 8:
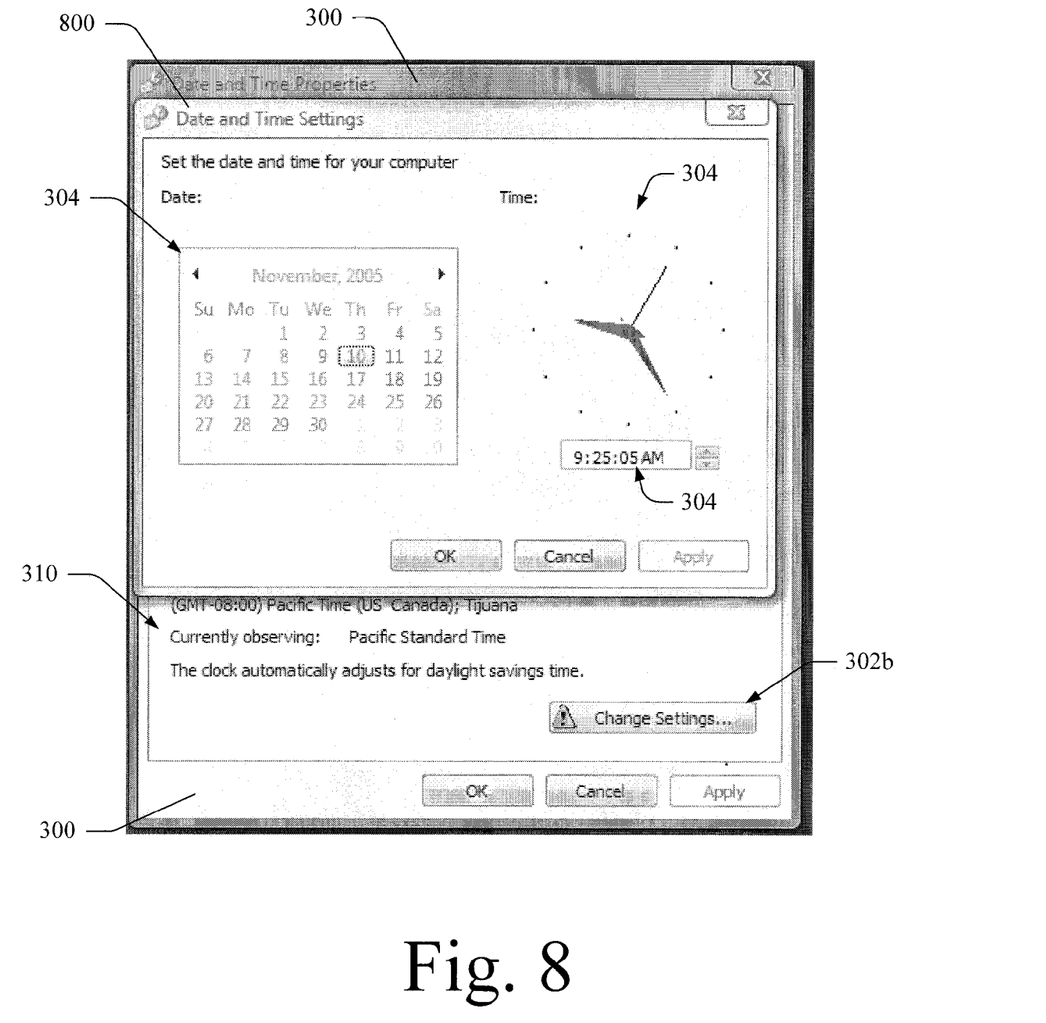
FIG. 8 illustrates an exemplary user interface enabling a user to perform a task.

FIG. 8 sets for an exemplary user interface 800 enabling the user to alter the operating system's date and time. Note that this user interface enables only those tasks 304 correlated with selected indicia 302a of FIG. 3. Tasks 310 that correlate to indicia 302b are not enabled.

The tools may alter a user interface to enable a task or may produce another user interface (as is done in FIG. 8). Producing another user interface separates those tasks that are newly enabled from those that are not, potentially offering clarity to the user. A separate user interface may also require fewer programming resources to implement.

Figure 9:
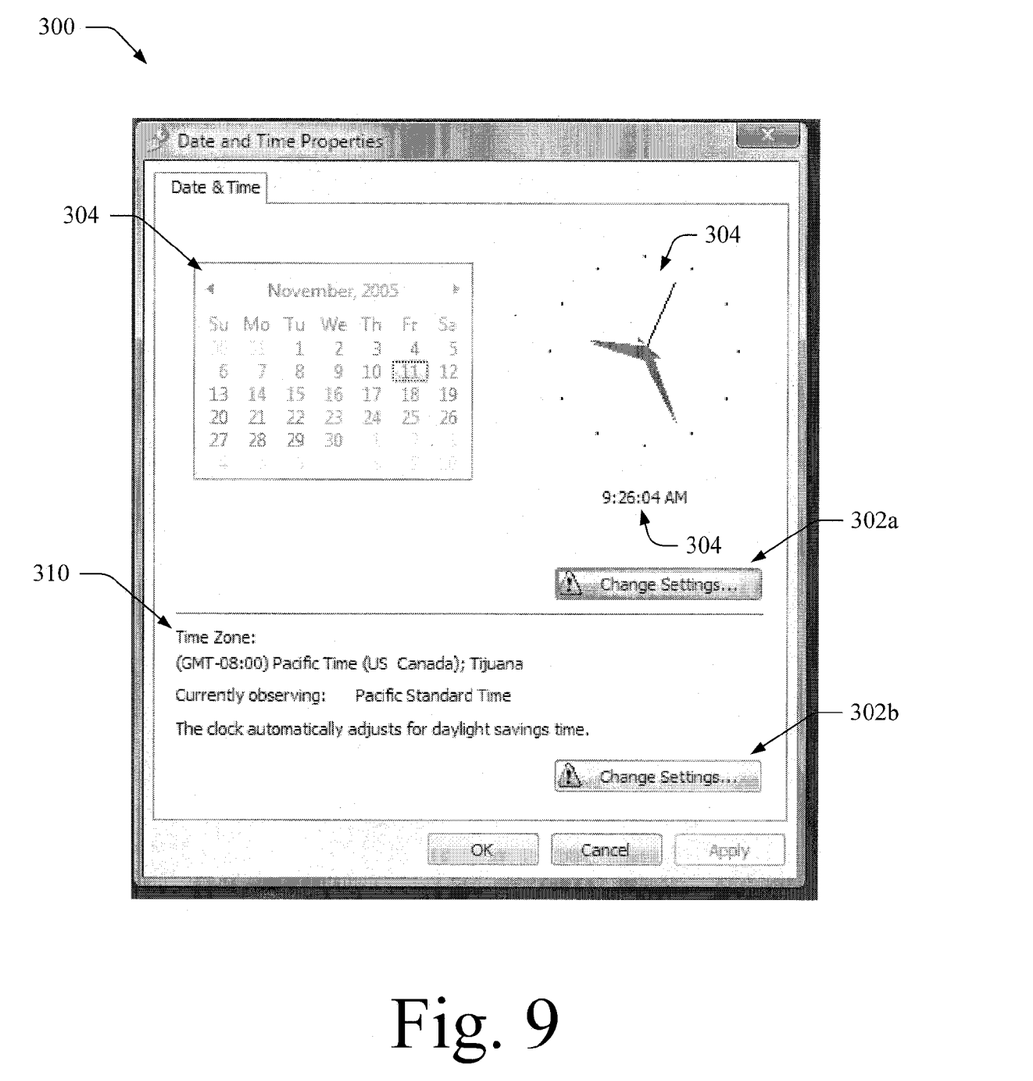
FIG. 9 illustrates the exemplary user interface of FIG. 3 following performance of a previously disabled task.

FIG. 9 sets forth the exemplary user interface 300 of FIG. 3 after a task has been performed, here changing the operating system's date to November 11th from November 10th.

Following performance of or permission to perform the prohibited task, rights elevator 114 may lower the user's rights (e.g., return to the user to his or her limited-rights account or rights context). In at least this sense the elevation of rights may be temporary. The rights elevator may also immediately reduce the rights or tie the elevated right to just the prohibited task. In this case, only the prohibited task may be permitted by elevating the rights of the user. This may help to reduce security risks inherent in the rights of the user being elevated for too long. It also may reduce the risk of a task being performed that is not permitted by the user's rights without the user elevating his or her rights specifically to permit that task.

In some cases the rights elevator returns the user to the prior rights context of the user's same session. In at least these cases, the tools permit a user to perform a task that is at first disabled or prohibited without the user having to change his or her login session.

Additional Exemplary User Interfaces for "Unlocking" a Task

Figure 10:
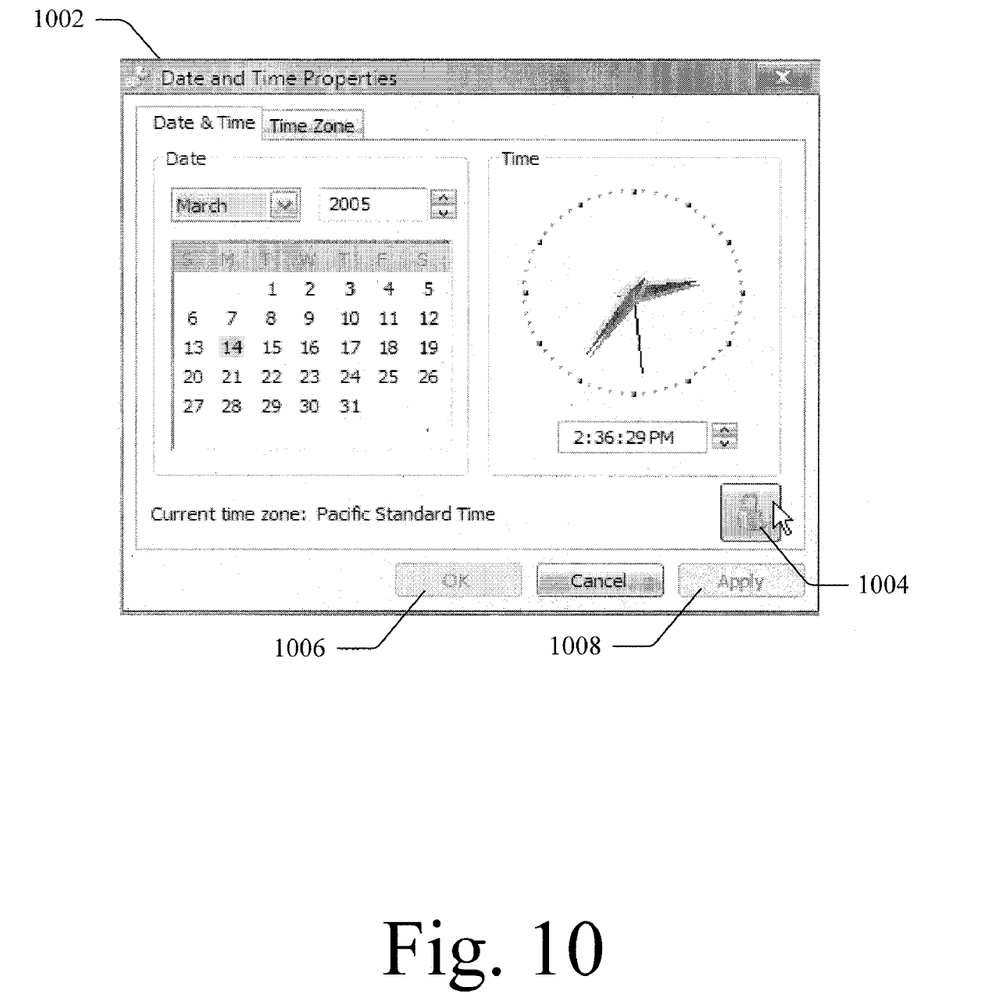
FIG. 10 illustrates an exemplary user interface having an unlock button.
Figure 11:
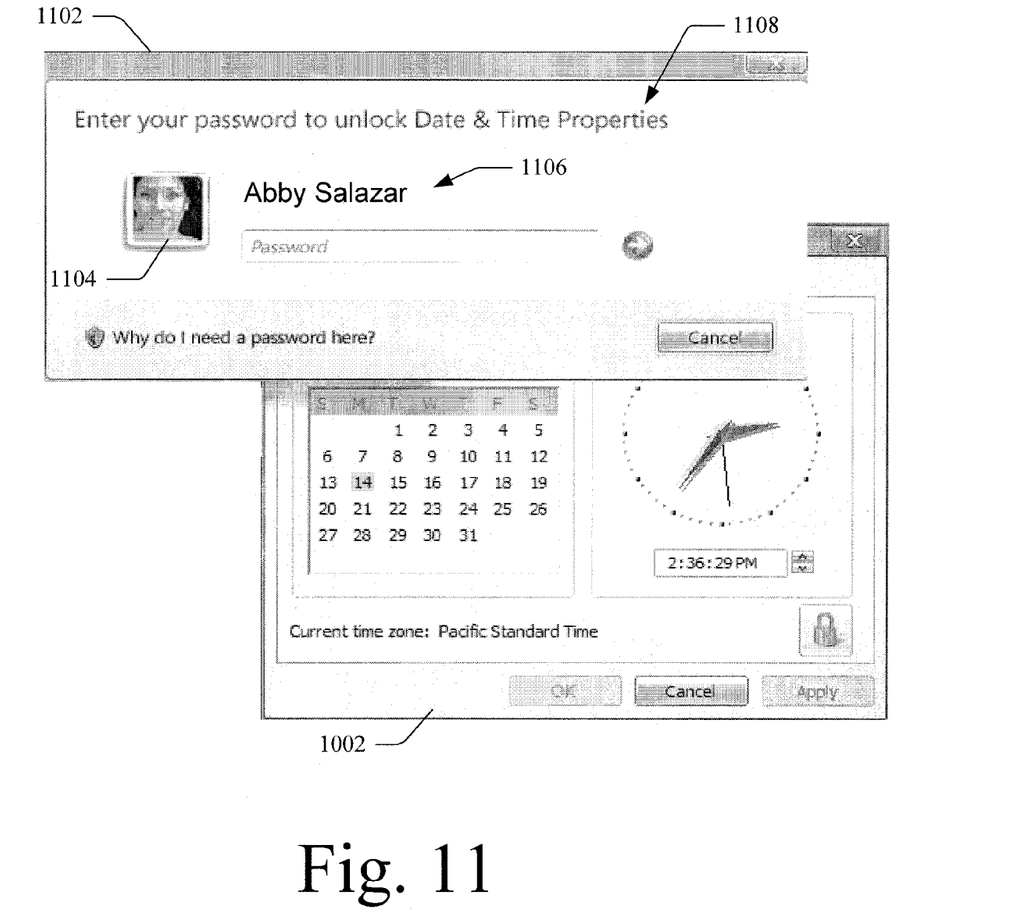
FIG. 11 illustrates an account having sufficient rights to "unlock" the task shown in FIG. 10.
Figure 12:
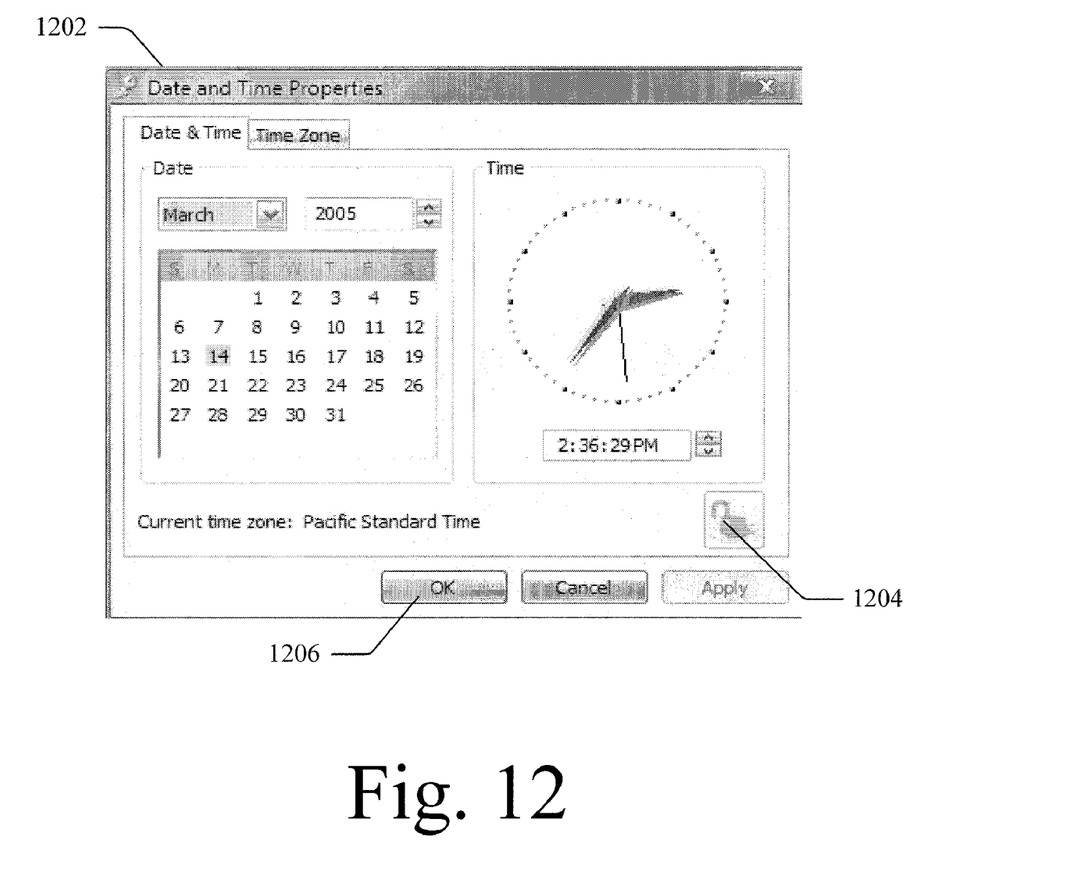
FIG. 12 illustrates the user interface of FIG. 10 with the task unlocked.

FIGS. 3, 7, and 8 describe an exemplary set of user interfaces for elevating a user's rights to change the operating system's date and time. FIGS. 10, 11, and 12 set forth another set of user interfaces also for elevating a user's rights to alter the operating system's date and time.

Here the application responsible for presenting and altering a system's date and time settings calls rights elevator 114 (e.g., requesting/attempting application 204 of FIG. 2) responsive to a user selecting to unlock the date and time of an operating system.

Referring to FIG. 10, a date and time user interface 1002 having an unlock button 1004 is shown. This unlock button prompts a user interface through which a user may select to unlock a task. User interface 1002 presents the date and time to the user but does not permit the user to alter the date or time. This prohibition is indicated by "OK" and "Apply" buttons 1006 and 1008 being unselectable, as well as the presence of the unlock button showing a locked padlock icon. A user may select to elevate his or her rights by clicking on unlock button 1004.

In response to this selection, the user interface generates a call to rights elevator 114. This call may follow a published API. The call indicates to the rights elevator that the user's rights need to be elevated. Responsive to receiving this call, the rights elevator presents a graphical user interface enabling the user to assent to elevate his or her rights.

Referring to FIG. 11, an exemplary user interface 1102 is shown. This user interface shows one account having sufficient rights to "unlock" the task. Two identifiers are used for this account, a user's picture 1104 and the account's name, entitled "Abby Salazar", shown at 1106. The user interface permits the user to submit a credential for the account, here with a password. This is indicated by a description 1108 of what is needed to unlock the task: "Enter your password to unlock Date & Time Properties".

Responsive to receiving the user's password for an account, the interface module forwards the account and password for authentication by authenticating module 118 of FIG. 1. This may be performed with the actions described as part of arrows 10, 11, and 12 of FIG. 2. Responsive to the account being authenticated, the application responsible for the system's date and time presents a user interface showing the user that the task is unlocked.

In FIG. 12, an exemplary unlocked task user interface 1202 is shown. This user interface shows—in contrast to user interface 1002 of FIG. 10—that the task is unlocked. Button 1004 of FIG. 10 now shows in FIG. 12 an unlocked padlock icon at 1204. This difference is also shown with the OK button 1006 of FIG. 10 now being selectable, shown at 1206 in FIG. 12.

Once the user completes the task or chooses not to perform the task, the user's rights may return to that of the user's limited-rights account. Thus, the user may change the date or time and select the OK button. After this, the task to change the date and time again may be locked.

CONCLUSION

System(s), techniques, and/or method(s) are described that enable a user to elevate his or her rights, such as by switching the user to an account having higher rights or a different, higher-rights context of a same account. They may also permit a user to elevate his or her rights with a simple assent, like clicking on a button or typing a keystroke, or with entry of credentials. By so doing, these systems and/or methods may permit a user to use a computer in relative safety from attacks by malicious code while also enabling the user to easily elevate his or her rights to perform potentially dangerous tasks. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method implemented at least in part by a computer, comprising:
   intercepting a first task comprising a non-user initiated attempt to install an application downloaded over the internet prior to the first task being performed in order to check the first task against rights of a user;
   identifying a second task;
   contacting a rights elevator to begin a process for elevating the user's rights;
   responsive to the user currently being logged on to the computer's operating system with an account having rights insufficient to permit the first task or the second task, prompting the user to enter a secure access sequence to elevate the rights of the user to a higher-rights context of the account, wherein the secure access sequence comprises simultaneous keystroke activation of more than one key;
   following entry of the secure access sequence and prior to elevating the rights of the user, enabling the user to assent to permit the first task through a user entry in addition to the secure access sequence;
   responsive to entry of the secure access sequence, initiating a process to minimally elevate the rights of the user to the higher-rights context of the account that minimally permits the first task without elevating the rights to another higher-rights context that would minimally permit the second task; and
   elevating the rights of the user effective to permit the first task, following entry of the secure access sequence and completion of the process to minimally elevate rights.

2. The method of claim 1, wherein the act of elevating is performed following entry of the secure access sequence and prior to another entry by the user.

3. The method of claim 1, wherein the act of enabling allows the user to assent by selecting another user account having rights sufficient to permit the first task and by entering credentials usable to authenticate the another user account.

4. The method of claim 3, further comprising receiving the credentials and authenticating the another user account based on the credentials, wherein the act of elevating changes the rights of the user to that of the another user account.

5. The method of claim 1, wherein the act of enabling the user to assent to permit the first task comprises presenting a graphical user interface, the graphical user interface having:

multiple account regions, each account region identifying an account capable of permitting the first task; and a credential region capable of receiving a credential for one of the accounts capable of permitting the first task.

6. One or more computer-readable storage media, wherein the computer-readable storage media exclude propagating carrier waves, the computer-readable storage media having computer-readable instructions encoded thereon, that, when executed by a computing device, configure the computing device to perform operations comprising:

presenting a user interface simultaneously comprising:
- a first task;
- a second task;
- a first indicia indicating a need to elevate current user rights to rights sufficient to perform the first task and not sufficient to perform the second task, the first indicia being selectable to initiate a process to elevate the rights to perform the first task corresponding to the first indicia and not the second task; and
- a second indicia indicating a need to elevate the current user rights to rights sufficient to perform the second task and not sufficient to perform the first task, the second indicia being selectable to initiate a process to elevate the rights to perform the second task corresponding to the second indicia and not the first task;
- identifying the first task or the second task as comprising a non-user initiated attempt to execute instructions from the internet; and responsive to receiving a selection of the first indicia, initiating the process to elevate the rights to rights sufficient to perform the first task corresponding to selected indicia but not unlimited rights.

7. The one or more computer-readable storage media of claim 6, the user interface further comprising a first region containing the first task and the first indicia and a second region containing the second task and the second indicia, the first region and the second region differentiated sufficient to indicate that the first indicia indicates a need to elevate the current user rights to rights sufficient to perform the first task and not sufficient to perform the second task.

8. The one or more computer-readable storage media of claim 6, wherein the first indicia comprises a triangular graphic.

9. One or more computer-readable storage media, wherein the computer-readable storage media exclude propagating carrier waves, the computer-readable storage media having computer-readable instructions encoded thereon, that, when executed by a computing device, configure the computing device to perform operations comprising:

presenting a first operating system user interface comprising a graphical indication of a single user account having a limited-rights context and a higher-rights context;

while the user account is operating within the limited-rights context:
- presenting a graphical indication on the first operating system user interface that a task comprising a non-user initiated attempt to install an application downloaded over the internet requires assent to permit the task, and
- enabling selection of the graphical indication to initiate a process to assent to permit the task; and presenting a second operating system user interface enabling performance of the task responsive to receiving the assent to permit the task, wherein the assent to permit the task facilitates operating within the higher-rights context of the single user account to permit the task and the higher-rights context of the single user account is not sufficient to permit another task.

10. The media of claim 9, wherein the first operating system user interface enables assent to permit the task without any credentials.

11. The media of claim 9, wherein an indicia is selectable to initiate a process to assent to permit the task.

12. The media of claim 9, further comprising, prior to presenting the second operating system user interface, receiving a selection to initiate a process to assent to permit the task, presenting a third operating system user interface enabling entry of a credential , and authenticating the credential.

13. The one or more computer-readable storage media of claim 6, wherein the selection of the first indicia initiates a process for elevating the rights to a level sufficient to perform the first task of a plurality of first tasks and sufficient to perform the second task of a plurality of second tasks, but not sufficient to perform all of the tasks of the plurality of first tasks and the plurality of second tasks.

14. The one or more computer-readable storage media of claim 6, wherein the selection of the second indicia initiates a process for elevating the rights to a level sufficient to perform the first task of a plurality of first tasks and the second task of a plurality of second tasks, but not sufficient to perform all of the tasks of the plurality of first tasks and the plurality of second tasks.

15. The media of claim 9, wherein the user account operating within the higher-rights context is limited to tasks corresponding to the graphical indication to initiate the process to assent to permit the task that is selected.

16. The method of claim 1, wherein enabling the user to assent allows the user to assent without entering credentials.

17. The method of claim 1, wherein responsive to entry of the secure access sequence, initiating a process to minimally elevate the rights of the account to a higher-rights context of the account that minimally permits the second task without elevating the rights of the account to another higher-rights context that would minimally permit the first task.

18. The one or more computer-readable storage media of claim 6, wherein, in the user interface, the selection of the second indicia initiates a process for elevating the rights of a user for the second task without being sufficient for the first task.

19. The one or more computer-readable storage media of claim 6, wherein, in the user interface, responsive to receiving the selection of the first indicia, initiating the process to elevate the rights to rights sufficient to perform the first task corresponding to selected indicia but not to rights sufficient to perform the second task.

* * * * *